United States Patent [19]

Fogg

[11] Patent Number: 4,546,696
[45] Date of Patent: Oct. 15, 1985

[54] WALL CONSTRUCTION FOR A VEHICLE CAB

[75] Inventor: Jeffrey R. Fogg, Decatur, Ill.

[73] Assignee: Caterpillar Tractor Co., Peoria, Ill.

[21] Appl. No.: 638,446

[22] PCT Filed: Apr. 5, 1982

[86] PCT No.: PCT/US82/00419

§ 371 Date: Apr. 5, 1982

§ 102(e) Date: Apr. 5, 1982

[87] PCT Pub. No.: WO83/03575

PCT Pub. Date: Oct. 27, 1983

[51] Int. Cl.[4] .............................................. B06H 1/24
[52] U.S. Cl. ...................................... 98/2.18; 98/38.3
[58] Field of Search ................... 98/2.18, 38 D, 40 N, 98/45; 126/299 D

[56] References Cited

U.S. PATENT DOCUMENTS

| | | | |
|---|---|---|---|
| 948,629 | 2/1910 | Johnson | 98/48 |
| T986,006 | 9/1979 | Simmons | 98/2 |
| 2,604,837 | 7/1952 | Backe | 98/2.18 |
| 2,681,608 | 6/1954 | Wunderlich | 98/2.18 |
| 3,866,580 | 2/1975 | Whitehurst et al. | 123/41.7 |
| 3,946,647 | 3/1976 | Larkfeldt | 98/40 N |
| 4,043,319 | 8/1977 | Jensen | 126/299 D |

Primary Examiner—Ronald C. Capossela
Attorney, Agent, or Firm—William C. Perry

[57] ABSTRACT

In construction vehicles (10) it is not uncommon to have the cab or operator's station (12) positioned directly adjacent the engine enclosure (14). Being so positioned, the transfer of the heat created by the engine (16) is often transferred directly into the confines of the cab (12) by a wall (28) of the cab (12). The wall construction (28) of this invention includes an air passage (41) in which a current of ambient air (49) is established within the wall (28). A pressure drop, which is created by an existing flowage of air (26) within the engine enclosure (14), is utilized to pull ambient air (49) from the cab interior (36) and through the air passage (41). The air moving through the passage (41) provides a cooling thereof to prevent the transfer of heat from the engine enclosure (14) to the cab interior (36).

8 Claims, 6 Drawing Figures

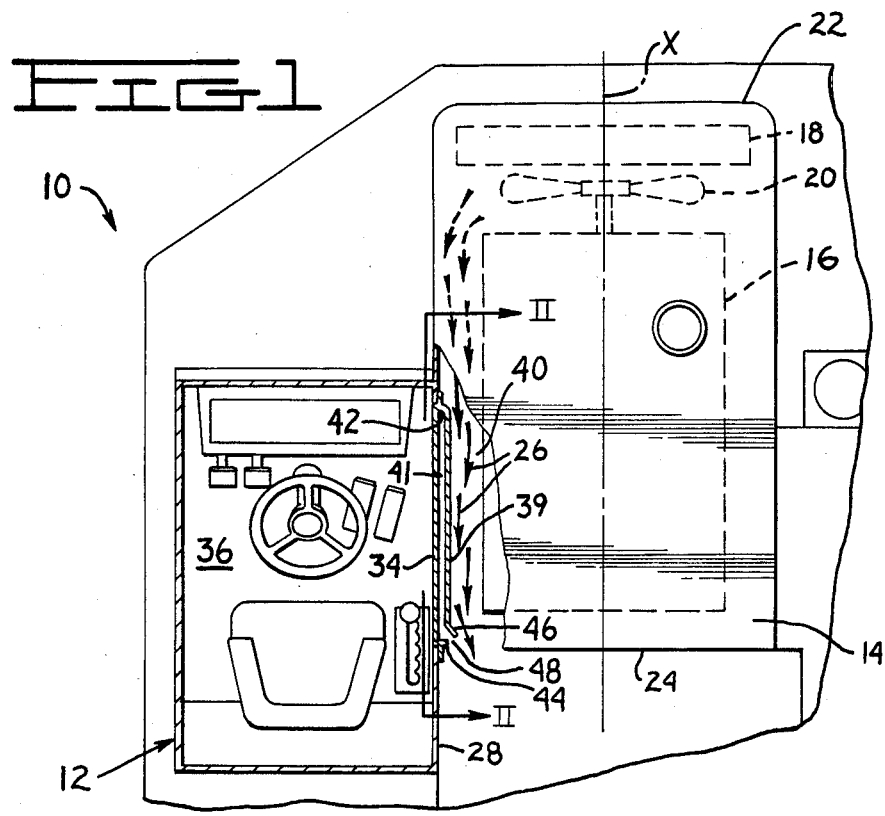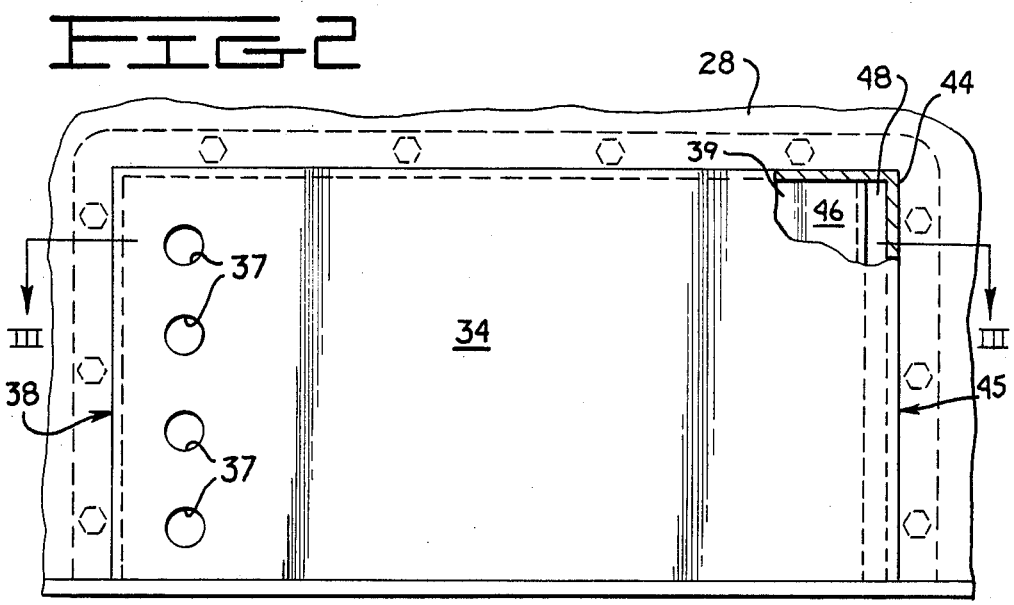

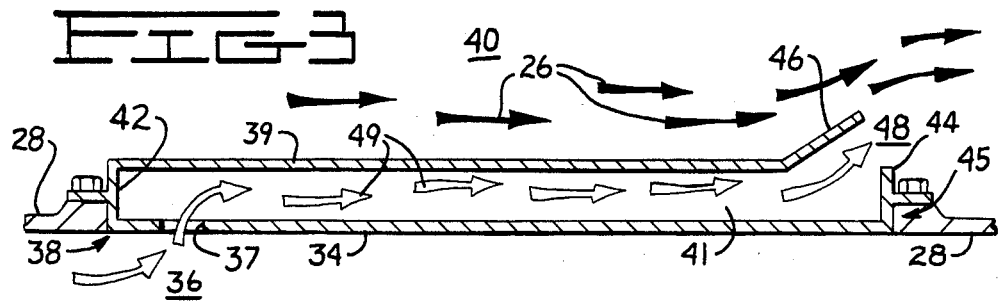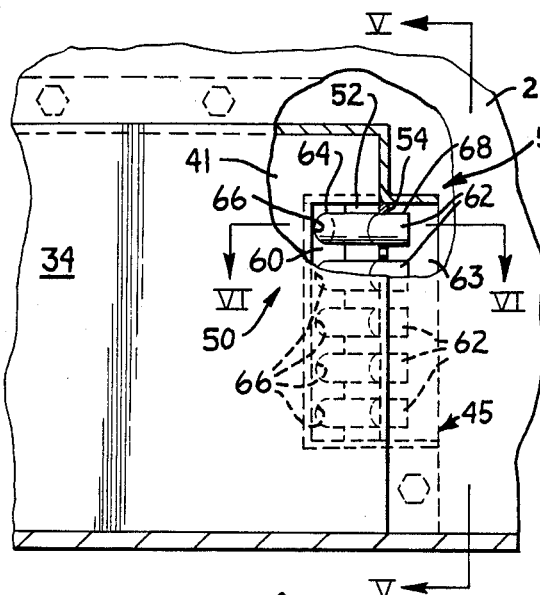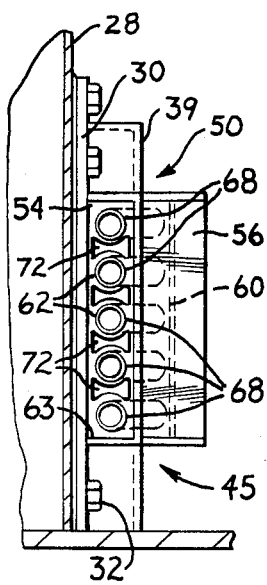

WALL CONSTRUCTION FOR A VEHICLE CAB

TECHNICAL FIELD

This invention relates to the construction of a vehicle cab wall and more particularly to the construction of a wall that is positioned between the interior of the cab and a source of heat such as an engine compartment.

BACKGROUND ART

In recent years, particular attention has been paid to the comfort of an individual that operates construction equipment. To that end, environmentally protected cabs have been developed to insure the comfort of an operator through the provision of heating and air conditioning systems. However, even with the provision of air conditioning, on many vehicles the positioning of the cab is such that it is mounted next to a source of heat such as an engine compartment. The heat generated by the engine is often trapped within the confines of an enclosure and thus serves to increase the temperature of surrounding structures such as the cab thus counteracting the effect of the air conditioning unit. In many instances, a cab wall will be the only barrier between an engine compartment and the inside of the cab which will result in the direct transfer of heat into the cab.

A system that provides for the cooling of an engine compartment as well as an adjacent compartment is typically shown in U.S. Pat. No. 3,866,580, issued to Whitehurst, et al, and is assigned to the assignee of this application. Cooling air for the engine enclosure is drawn through air ducts in panels located at the rear and along the sides of the vehicle. Movement of the air occurs as a result of a pressure differential that is created by a venturi-type relationship between the engine exhaust pipe and a surrounding tubular encasement. Similarly, air is drawn through air ducts in panels surrounding the compartment that houses the radiators which is positioned just forward of the engine compartment. The air is drawn through the compartment in conventional fashion by a fan and is directed through exhaust ducts in the front panels of the compartment. While this patent discloses an effective way of removing heat from within an enclosure housing a heat producing component, it does not address a method of preventing the transfer of that heat to adjacent enclosures.

U.S. Defensive Publication No. T986,006, issued to Gerald P. Simmons, is also assigned to the assignee of this invention and discloses an air circulation system for a vehicle cab. In this system outside air is drawn through the cab by a venturi flow created between the exhaust pipe of the engine and the tubular structure that houses it. Alternatively, air may be drawn through the cab by an engine driven fan that is normally associated with the radiator and engine cooling system. Here again, this design provides only a system which circulates air within the cab and does not address the prevention of heat transfer between two compartments.

The present invention is directed to overcoming one or more of the problems as set forth above.

DISCLOSURE OF THE INVENTION

In one aspect of the present invention a wall construction for a vehicle cab is disclosed. The wall is formed by first and second wall members that form an air passageway therebetween. A current of air flow is directed along the second wall member which interacts with means associated with the second wall member to create a drop in air pressure. The pressure drop is sufficient for drawing ambient air through an opening in the first wall member and through the air passageway. The movement of the air through the passageway has a cooling effect on the cab wall.

With the ambient air being drawn through the air passage, the wall may be positioned next to a source of heat such as an engine enclosure. The cooling of the air passage and thus the wall itself, prevents the transfer of heat from the engine compartment to the interior of the cab.

BRIEF DESCRIPTION OF THE DRAWINGS

FIG. 1 is a diagrammatic, fragmentary top view of the cab of a construction vehicle shown partially in cross section to illustrate a wall construction that embodies the principles of the invention;

FIG. 2 is a diagrammatic, fragmentary side view taken along lines II—II of FIG. 1;

FIG. 3 is a diagrammatic, cross-sectional top view taken along lines III—III of FIG. 2;

FIG. 4 is a diagrammatic, fragmentary side view similar to that of FIG. 2 which discloses an alternate embodiment of the present invention;

FIG. 5 is a diagrammatic end view taken along lines V—V of FIG. 4; and

FIG. 6 is a diagrammatic cross-sectional view taken along lines VI—VI of FIG. 4.

BEST MODE FOR CARRYING OUT THE INVENTION

Referring to the drawings, FIG. 1 discloses a portion of a construction vehicle 10 that has a cab or operator's station 12 positioned thereon. Directly adjacent the cab lies an enclosure 14 which houses various components such as an engine 16 and a radiator 18. A fan 20 which is driven by the engine, pulls air through a front portion 22 of the enclosure and then through the radiator for cooling purposes. The air is then directed toward a rear portion 24 of the enclosure under pressure from the fan. The air flows in a current through the enclosure and is indicated by arrows 26 in the drawings.

Interposed between the cab 12 and the enclosure 14 is a sidewall 28 of the cab. The sidewall has a first panel 34 that faces the interior 36 of the cab and extends longitudinally along a centerline X of the vehicle. A plurality of openings 37 are formed along a forward end 38 of the inner panel. A second longitudinally extending panel 39 of the sidewall extends parallel to the first panel and faces the interior 40 of the enclosure 14. The panel 39 is spaced from panel 34 to form a channel or air passage 41. The panels are connected to each other at their forward ends 38 by a third panel 42 that is transversely oriented to the air passage. A fourth panel 44 which is also transversely oriented to the air passage is connected to panel 34 at a rear portion 45 of sidewall 28. An extension or wing member 46 is connected to the second panel 39 and extends at a rearwardly directed angle therefrom into the interior 40 of enclosure 14. An opening 48 is formed between the wing member 46 and the fourth panel 44 which provides communication of conditioned air, illustrated by arrows 49 (FIG. 3), between air passage 41 and the interior 40 of enclosure 14.

Referring now to FIGS. 4, 5 and 6, an alternate embodiment of the present invention is disclosed. Components in this embodiment that are identical to those previously described are indicated by the same reference numerals.

A baffle assembly 50 is positioned at the rear portion 45 of the sidewall 28 which includes a deflector plate 52. The deflector plate has a first portion 54 that extends transversely across the air passage 41 and is connected to first and second panels 34 and 39. A second portion 56 of the deflector extends from the first portion through an opening 58 (FIG. 6) in second panel and into the interior 40 of enclosure 14 at a forwardly extending angle. A support plate 60 extends between the second portion of the deflector and the second panel 39 and is positioned generally perpendicular to the angle of the second portion 56.

A plurality of horizontally oriented conduits 62 extend between the interior 40 of enclosure 14 and a chamber 63 formed on the rear portion 45 of sidewall 28. A first end 64 of each conduit is mounted within a plurality of vertically spaced openings 66 in support plate 60. Similarly, a second end 68 of each conduit is mounted within a plurality of mounting holes 70 (FIG. 6) that are formed in the first portion 54 of the deflector plate 52 and extend into chamber 63. As best illustrated in FIGS. 4 and 5, it can be seen that a plurality of openings 72 are formed in the first portion of the deflector plate and are positioned between each of the conduits. The openings permit communication of conditioned air (arrows 49) between the air passage 41 and the interior 40 of enclosure 14 at the rear portion 45 of the sidewall 28 by way of chamber 63.

INDUSTRIAL APPLICABILITY

In the operation of the vehicle 10, the fan 20, driven by the engine 16, pulls air through enclosure 14 and directs a current of air 26 to the rear of the enclosure for expulsion therefrom. The current flows by the second panel 39 of sidewall 28 under pressure where it encounters the wing member 46. The air flow is deflected by the angularly extending wing and, as it moves around the wing, it creates a drop in pressure at the opening 48 in wall member 44. As a result of the pressure drop, the conditioned air 49 is drawn from the cab interior 36 through openings 37 and into air passage 41. From the air passage 41, the air is syphoned through opening 48 and into the interior 40 of the enclosure 14.

Thus, it can be seen that a current of conditioned air is established within the air passage. The air flow provides a medium for cooling between the second panel 39 which draws heat from the engine 16 and first panel 34 which may be under the cooling influence of an air conditioner.

Alternatively, the flow of air 26 may be opposed by a baffle assembly 50 as is shown. The deflector portion 56 is angled into the flow of air which forces a portion of the air flow 26 into the first ends 64 of conduits 62. The conduits, in turn, direct the air flow into the air passage 41 where it is exhaust at an accelerated velocity into the chamber 63 formed by the rear portion 45 of sidewall 28. The passage of air at an accelerated rate between the panels 34 and 39 establishes a venturi-type flow of air within the air passage. As a result, conditioned air 49 is drawn from the cab interior 36 into the air passage through openings 37 in the first panel. The conditioned air is then drawn out of the air passage through the openings 72 in the first portion 54 of the deflector plate 52 and exhausted back into the interior 40 of the enclosure 14.

While the invention has been described in connection with an enclosed cab, one skilled in the art will appreciate that the invention is not necessarily so limited. For example, this invention can be applied to the inner wall of an operator's station that has no environmental enclosure. Whereas the novel wall construction hereinbefore described may be applied to prevent a heat source from counteracting the effects of an air conditioner, the same may be applied in the absence of air conditioning.

Other aspects, objects and advantages of this invention can be obtained from a study of the drawings, the disclosure, and the appended claims.

I claim:

1. A wall interposed between a heated compartment having a flow of air therethrough and an adjacent relatively cooler compartment comprising:
   a first panel exposed to said cooler compartment having at least one opening therethrough;
   a second panel exposed to said heated compartment adjacent the flow of air and being positioned in spaced relation to said first panel to form an air passage there between; and
   means operatively associated with the second panel for creating a pressure drop sufficient for drawing air from within the cooler compartment through the opening in the first panel and through the air passage for cooling thereof in response to movement of the air flowing past the second panel.

2. A wall construction as set forth in claim 1 wherein the second means further comprises a wing member connected to the second wall member and extending at an angle therefrom away from the air passage and into the flow of air.

3. A wall construction as set forth in claim 2 wherein the opening is formed in the second panel adjacent the wing member to allow movement of the air from the air passage into the heated enclosure.

4. A wall construction as set forth in claim 1 wherein said means further includes:
   a baffle assembly having a first portion having at least one opening defined therein and being connected to said first and second panels to extend across the air passage, and a second portion extending from the second panel at an angle therefrom in opposition to the air flow;
   a chamber formed on said first baffle portion;
   at least one conduit having a first end connected to the second baffle portion at a location removed from the air passage and in communication with the air flow, and a second end extending through the first baffle portions and into the chamber, said conduit being positioned to direct a portion of the air flow into the chamber.

5. A wall as set forth in claim 4 wherein the opening in the first baffle portion allows air from the passage to be syphoned into the chamber in response to a drop in air pressure resulting from a venturi condition created between the chamber and the velocity of the air flowing from the first end of the conduit housed therein.

6. A wall as set forth in claim 4 wherein a plurality of vertically aligned conduits extend through said first baffle portion and an opening is positioned in the first baffle portion between each of the conduits.

7. A wall as set forth in claim 1 wherein the wall is positioned between the interior of a vehicle cab and an engine enclosure and that air from the cab is drawn through the air passage by said means to prevent the transfer of heat from the engine enclosure to the vehicle cab.

8. A wall positioned between an interior of a vehicle cab and a heated engine enclosure having a flow of air therethrough, comprising:

a first panel exposed to said interior of said vehicle cab having at least one opening therethrough;

a second panel exposed to said engine enclosure adjacent the flow of air and being positioned in spaced relation to said first panel to form an air passage therebetween; and means operatively associated with the second panel for creating a pressure drop sufficient for drawing air from the cab through the air passage to prevent the transfer of heat from the engine enclosure to the vehicle cab.

* * * * *